Patented Dec. 26, 1922.

1,440,352

UNITED STATES PATENT OFFICE.

ORLANDO C. GATRELL, OF EL DORADO, KANSAS.

METHOD OF TREATING OIL CONTAINING WATER.

No Drawing.   Application filed November 1, 1920.   Serial No. 421,161.

*To all whom it may concern:*

Be it known that I, ORLANDO C. GATRELL, a citizen of the United States, residing at El Dorado, in the county of Butler and State of Kansas, have invented new and useful Improvements in Methods of Treating Oil Containing Water, of which the following is a specification.

This invention relates to the method of treating oil containing water, and the object is to provide for the treatment of so-called roily or cut oil, whether crude or refined for the purpose of removing the water contained therein.

A further object is to provide a simple but extremely effective method of removing the water from the oil in a storage tank of any capacity located in an oil field, by producing a settling operation, resulting in the movement of the oil toward the surface and leaving the material of greater specific gravity at the bottom of the tank.

A still further object is to provide for the treatment of oil of the kind specified, by heating to a temperature of from ninety degrees to one hundred and thirty° degrees Fahrenheit, and adding cement, or cement and slacked lime, and allowing the oil to stand for a period of from six to twenty-four hours, at the expiration of which it is ready for use,—the time depending upon the extent of purification or settling required.

As above indicated, the oil may be treated while in the storage tank of any capacity, located in the field, and in carrying out the operation, Portland cement produces excellent results. While it is entirely practicable to obtain good results with the use of cement alone, a given proportion of slacked lime may be added, with advantage.

The compound which may consist of ninety per cent of cement and ten per cent of slacked lime, is introduced into the tank and into the oil therein, in dry form, being preferably sifted in a somewhat uniform manner over the surface of the oil. The oil should be agitated, or in motion while the compound is settling toward the bottom, and as a preliminary step the oil should be heated to a temperature of at least ninety degrees Fahrenheit. If the weather is cold, and the condition of the oil requires it, the temperature should be raised to one hundred and twenty degrees or one hundred and thirty degrees Fahrenheit. The sifting operation referred to is not necessary under all conditions, as the compound may merely be thrown into the tank.

In practice, about 100 pounds of the compound are used for a hundred barrel tank, and about 400 pounds for a 500 barrel tank of oil.

The oil is allowed to stand for a period of six hours to twenty-four hours, depending upon the oil being treated and is then ready for use.

What is claimed is:

1. The method herein described for dehydrating oil in storage tanks, consisting of heating a quantity of oil to a temperature of at least ninety degrees, agitating the oil, and introducing thereinto a quantity of Portland cement in powdered form.

2. The method herein described for dehydrating oil in storage tanks, consisting in heating a quantity of oil, agitating the oil and introducing thereinto Portland cement and slacked lime, in powdered form.

3. The method herein described for dehydrating oil in storage tanks, consisting of heating a quantity of oil to at least ninety degrees Fahrenheit, agitating the oil, introducing thereinto a compound composed of powdered Portland cement and slacked lime, in the proportion of ninety per cent of the former and ten per cent of the latter, and allowing the whole to settle.

In testimony whereof, I affix my signature.

ORLANDO C. GATRELL.